US009906466B2

(12) United States Patent
Eda et al.

(10) Patent No.: US 9,906,466 B2
(45) Date of Patent: Feb. 27, 2018

(54) FRAMEWORK FOR QOS IN EMBEDDED COMPUTER INFRASTRUCTURE

(71) Applicant: INTERNATIONAL BUSINESS MACHINES CORPORATION, Armonk, NY (US)

(72) Inventors: Sasikanth Eda, Ramavarappadu (IN); Dean Hildebrand, Bellingham, WA (US); Sandeep R. Patil, Pune (IN); William W. Owen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 14/739,158

(22) Filed: Jun. 15, 2015

(65) Prior Publication Data
US 2016/0366068 A1 Dec. 15, 2016

(51) Int. Cl.
*H04L 12/911* (2013.01)
*H04L 29/08* (2006.01)
*H04L 12/927* (2013.01)

(52) U.S. Cl.
CPC .......... *H04L 47/821* (2013.01); *H04L 47/805* (2013.01); *H04L 47/823* (2013.01); *H04L 67/10* (2013.01)

(58) Field of Classification Search
CPC ....... H04L 47/12; H04L 47/821; H04L 67/10; H04L 67/1002; H04L 67/1036; G06F 9/5072
USPC ................................. 709/220, 221, 223, 226
See application file for complete search history.

(56) References Cited

U.S. PATENT DOCUMENTS

| 5,857,197 | A | * | 1/1999 | Mullins ............. G06F 17/30607 |
| 9,501,493 | B1 | * | 11/2016 | Banerjee ............... G06F 9/4881 |
| 2011/0238707 | A1 | * | 9/2011 | Wong ..................... G06F 17/248 707/802 |
| 2011/0243553 | A1 | * | 10/2011 | Russell .............. G06Q 30/0631 398/25 |
| 2011/0265088 | A1 | * | 10/2011 | Devadhar ............... G06F 9/505 718/102 |
| 2012/0054624 | A1 | * | 3/2012 | Owens, Jr. ............ G06F 9/5072 715/735 |
| 2012/0131591 | A1 | * | 5/2012 | Moorthi ................. G06Q 10/06 718/104 |

(Continued)

OTHER PUBLICATIONS

Jones MT. Anatomy of a cloud storage infrastructure. IBM developer works (Nov. 30, 2010). Nov. 30, 2010.*

(Continued)

*Primary Examiner* — Ranodhi Serrao
*Assistant Examiner* — James Fiorillo
(74) *Attorney, Agent, or Firm* — Griffiths & Seaton PLLC

(57) ABSTRACT

Various embodiments providing a framework for Quality of Service (QoS) within and between globally distributed computing components by a processor. At least one resource required for a computing process is estimated by examining information associated with a resource template. A storlet is allocated as the at least one resource at a storage node, thereby offloading computing elements to at least one storage unit. The allocated storlet performs the computing process according to constraints delineated by the resource template.

18 Claims, 10 Drawing Sheets

(56) References Cited

U.S. PATENT DOCUMENTS

| | | | |
|---|---|---|---|
| 2013/0013444 A1* | 1/2013 | Vandikas | G06Q 10/00 705/26.5 |
| 2013/0080619 A1 | 3/2013 | Assuncao et al. | |
| 2013/0179481 A1 | 7/2013 | Halevy | |
| 2013/0227232 A1 | 8/2013 | Berg et al. | |
| 2013/0311778 A1* | 11/2013 | Cherukuri | H04L 63/0272 713/171 |
| 2014/0012988 A1* | 1/2014 | Kruempelmann | H04L 67/1036 709/226 |
| 2015/0036480 A1* | 2/2015 | Huang | H04L 41/0663 370/220 |
| 2015/0172130 A1* | 6/2015 | Colla | H04L 41/12 709/223 |
| 2015/0235044 A1* | 8/2015 | Cohen | G06F 21/6218 726/17 |
| 2015/0235049 A1* | 8/2015 | Cohen | G06F 21/6245 726/28 |
| 2015/0236959 A1* | 8/2015 | Cai | H04L 47/125 709/235 |
| 2016/0132805 A1* | 5/2016 | Delacourt | G06Q 10/06313 705/7.23 |
| 2016/0139835 A1* | 5/2016 | Fiebrich-Kandler | G06F 3/0665 711/114 |
| 2016/0156513 A1* | 6/2016 | Zhang | H04L 41/0806 709/220 |
| 2016/0164723 A1* | 6/2016 | Cimprich | H04L 41/0806 709/221 |
| 2016/0212020 A1* | 7/2016 | Gupte | H04L 67/10 |
| 2017/0054796 A1* | 2/2017 | Eda | H04L 67/1002 |

OTHER PUBLICATIONS

Connor D, Corrigan PH, Bagley JE, NOW SS. Cloud storage: Adoption, practice and deployment. An Outlook Report from Storage Strategies NOW. Apr. 4, 2011.*

Nair MK, Gopalakrishna V. 'CloudCop': Putting network-admin on cloud nine towards Cloud Computing for Network Monitoring. InInternet Multimedia Services Architecture and Applications (IMSAA), 2009 IEEE International Conference on Dec. 9, 2009 (pp. 1-6). IEEE.*

Internet Society RFCS et al., "NSIS Signaling Layer Protocol (NSLP) for Quality-of-Service Signaling", Oct, 7, 2010 an IP.com Prior Art Database Technical Disclosure; http://ip.com/IPCOM/000200343.

Sydir, JJ. et al., "Providing end-to-end QoS assurances in a CORBA-based system"pp. 53-61, Proceedings First International Symposium on Object-Oriented Real-Time Distributed Computing (ISORC '98), IEEE Computing Society; 1998.

Internet Society RFCS et al, "QSPEC Template for the Quality-of-Service NSIS Signaling Layer Protocol (NSLP)", Oct. 7, 2010 an IP.com Prior Art Database Technical Disclosure; http://ip.com/IPCOM/000200344.

* cited by examiner

FRAMEWORK FOR QOS IN EMBEDDED COMPUTER INFRASTRUCTURE

BACKGROUND OF THE INVENTION

Field of the Invention

The present invention relates in general computing systems, and more particularly to, various embodiments for providing a framework for of Quality of Service (QoS) characteristics in an embedded computing infrastructure built within a globally-distributed multi-tenant object storage namespace.

Description of the Related Art

Today with modern technology, large volumes of data are storable on disk drives; these drives can exist as a solo entity, or as part of a broader make up within a larger storage environment. Traditionally, object storage may be used for backup, archival, data mining, search, analytics, and other purposes. In some cases, object storage is utilized as a low-cost storage tier in a multiple-tier storage hierarchy. Unstructured/raw data resides in object storage for a much longer tenure when compared with traditional computing storage infrastructure.

In a traditional object storage environment, QoS implementations in a multi-tenant environment may be framed on a number of bases, including storage disk classification, network bandwidth utilization, and a number of concurrent requests (e.g., GET, PUT, etc.), as well as maximum object size, support for meta-data operations, and the like. However, with the advent of new embedded computing infrastructures, featuring built-in object storage architectures, multiple QoS concerns may arise. For example, as currently no separation exists at the object layer, and each tenant belonging to a particular object storage ecosystem has equal rights towards the computation resources, the disparity between various users, the needs of those users, and the priorities needing to be placed on various user processes over others lend to QoS characteristics not being fully integrated into the services provided to individual tenants. For example, currently, each tenant shares the same hardware resources in a particular storage node of a distributed storage environment. Currently, all users are treated equally in object storage environments; yet users, resource needs, and priorities may be vastly different, and furthermore, may change over time.

Consider the following example, in view of FIG. 1, which depicts traditional object storage architecture 100 in the prior art. Object storage architecture 100 includes two entities 108, 110/node groups 108, 110. The nodes in node groups 108, 110 designated as proxy nodes are utilized as distributed load handling/request handling nodes into the namespace. The nodes designated as storage nodes are responsible for writing into the storage devices/storage subsystems.

User 102 and 104 direct computing activities (e.g., writing data) towards the load balancer 106 component. The computing activities may include input/output (I/O) operations to storage units, where the load balancer 106 assists in determining which of the proxy nodes to be used depending upon the load currently handled by each of the proxy nodes. Both user 102 and 104 essentially are given unlimited access to the resources in the node groups 108, 110, as directed by the load balancing component 106.

Object storage architecture 100 generally serves as a storage unit 100/storage repository 100. Were architecture 100 utilized for data analysis, (e.g., extraction of meaningful information from raw data) of the data residing in the associated storage units, an additional client or associated computing component would be necessitated to perform such analysis. In other words, data 112 for further processing or analysis typically must be pulled from storage nodes to other computing nodes for such processing.

While efforts are being made to consolidate processing and computation functionality, the current object storage framework is inadequate to address the differing tenants (users) with differing priorities, resource needs, and computing processes that may be associated to each. Compute infrastructure embedded object storage architectures are built, instead, for single tenancy or for a single user, and lack an ability to address the aforementioned challenges of execution of computation algorithms among differing tenancies and/or users. A need exists for a mechanism whereby the individual needs of particular tenants are adequately addressed within an object storage framework, such that available scarce resources are appropriately allocated to tasks having the greatest priority, as well as tailored to customer/client QoS opted plans, and geared to improve the overall performance of the computing architecture, while also serving the needs of the tenant/user in the best possible manner.

SUMMARY OF THE INVENTION

To address the aforementioned needs, various embodiments for providing a framework for Quality of Service (QoS) within and between globally distributed computing components by a processor are provided. At least one resource required for a computing process is estimated by examining information associated with a resource template. A storlet, an engine providing extension and execution services in close proximity to data storage, is allocated as the at least one resource at a storage node, proxy node, or interface node, thereby offloading computing elements to at least one storage unit. The allocated storlet performs the computing process according to constraints delineated by the resource template. The offloading of computing elements to storage units allows for effective resource utilization and direct value from data, while the tailoring of computing processes according to the plan specified by the resource template provides a framework to limit computation resources used by the storlet engine according to the QoS plan adopted by the tenant.

In a further embodiment, a particular QoS for a certain user/tenant may be identified by comparing identification information with information in a predefined table. The resource template may then be defined for the user/tenant based on the identified QoS. Information, such as header or metadata information that is associated with the computing process to be performed, may be then appended to the resource template. The identification of a particular QoS for a certain tenant, and tailoring of a resource utilization model to match the identified QoS, allows for effective multi-tenant management in the compute infrastructure embedded object storage environment.

In a further embodiment, the resource template may be examined, including the appended information, as defined for the user. If the estimated at least one resource required for the computing process exceeds the delineated constraints of the resource template, an incompatibility may be returned. Conversely, if the estimated at least one resource required for the computing process does not exceed the delineated constraints of the resource template, the storlet may then be allowed to proceed to perform the computing process. The gatekeeping function of allowing the storlet to commence the computing process assuming that the resource template matches the computing process to be performed, helps to effectively manage the scarce storage resource among multiple tenants as will be further described.

In a further embodiment, the storlet (and performance thereof) may be monitored to determine resource utilization to provide feedback for future storlet allocations.

In a still further embodiment, the object storage environment may act to limit an access of the computing process to an embedded computing infrastructure associated with the storlet, select a storage media determined to appropriately correspond to the resource template for the computing process, and/or limit an access of the computing process to at least one client. Again, such actions allow for the effective multi-tenant management of resources among the object storage architecture.

In addition to the foregoing exemplary embodiments, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
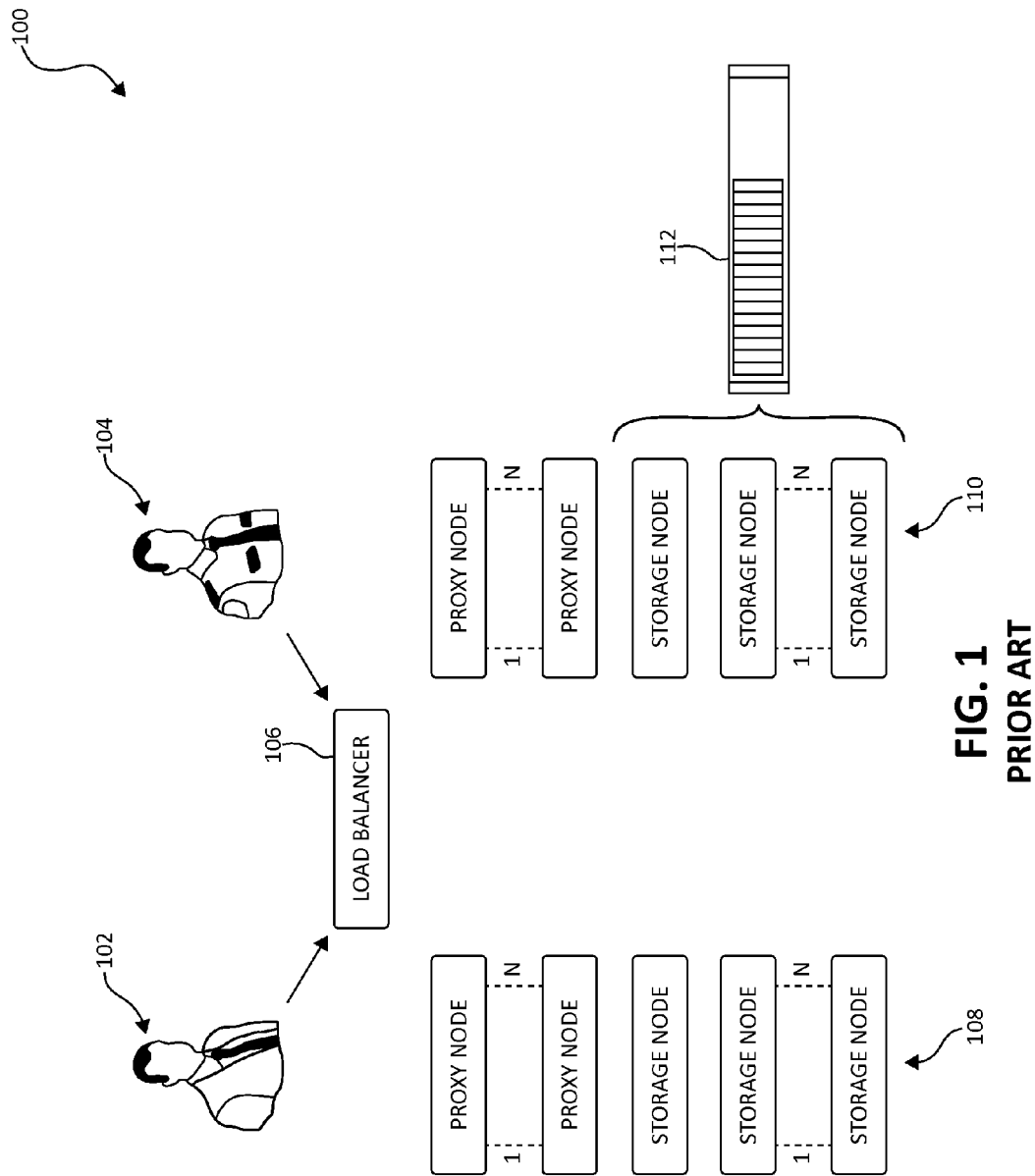
FIG. 1 is an exemplary block diagram showing traditional object storage functionality in the prior art.
Figure 2:
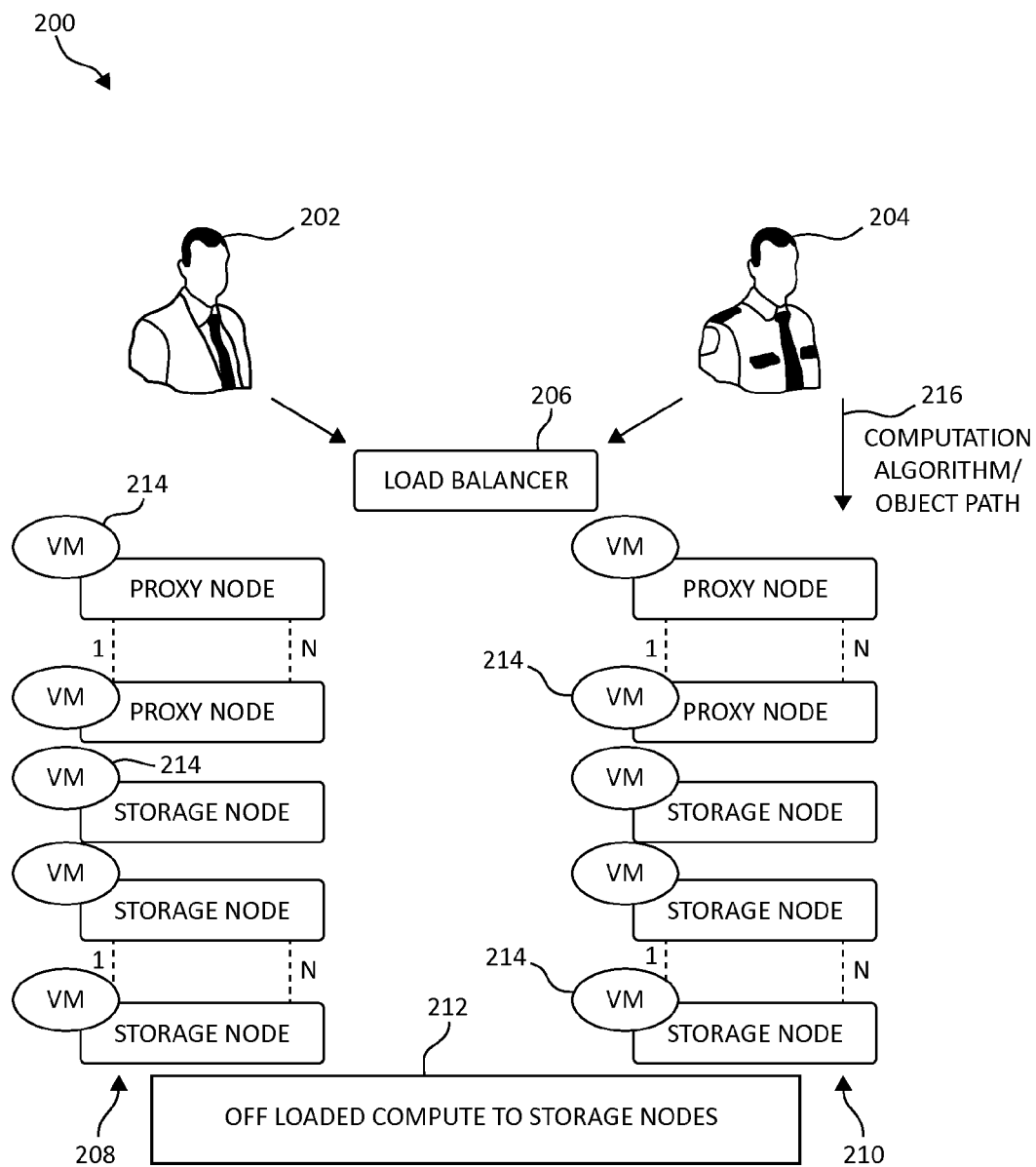
FIG. 2 is an exemplary block diagram showing an object storage architecture where compute functionality is offloaded to various storage nodes.

Turning now to FIG. 2, an object storage architecture 200 is depicted. Here, embedded computing infrastructure is built into to the object storage architecture 200, such that computation engines (i.e., processing capability) 212 are built into the storage nodes as will be described. Proxy nodes in groups 208, 210 are responsible for writing and reading information from the storage nodes in a manner similar to that previously described in FIG. 1. Here, however, the storage nodes and proxy nodes in groups 208, 210 incorporate offloaded computing functionality from other processing devices (not shown) as functionality 212. In other words, the storage nodes now have processing capabilities onsite for analysis and computation, thus alleviating the need for an external compute node(s) for such processing capabilities. In the exemplary architecture 200 as depicted, the end user (e.g., users 202, 204) frames computation processes and deploys (or passes) the processes to the computation engine functionality 214. This functionality 214 may, as shown, be embodied as virtual machines 214, or as dockers, containers, or similar computation/processing engines 214. Accordingly, the storage nodes and proxy nodes in groups 208, 210 then conduct themselves effectively as compute nodes, and return various processing results back to the end user 202, 204, which again, may use the assistance of the load balancing component 206.

With the above-described embedded computing architecture 200, consider the following example. Assume a scenario where, in a single object namespace, access is shared by to different tenants, each holding two respective (differing) QoS tariff plans. In one example, a Tenant A may subscribe to a "gold" plan, and a Tenant B may subscribe to a "bronze" plan. In a traditional QoS framework, the object storage vendor is configured with separation at the storage layer. For example, the gold customer may be provided media to store his/her objects on a Solid State Drive (SSD)-based storage node; and the bronze customer may be provided media to store his/her objects on a Serial Attachment (SATA)-based storage node, each with corresponding levels of performance. In this scenario, the vendor may have a corresponding limited amount of capabilities to manage the storage of the differing tenants. For example, the vendor may limit the number of operations per tenant (e.g., the gold tenant may be allowed to perform 1000 GET/PUT requests per day, while the bronze tenant may be allowed to perform 500 GET/PUT requests per day).

In view of FIG. 2, and the foregoing example, the example provided may not be applied to an architecture 200 as previously described, where the tenant may perform offloading tasks of computation to various storage nodes. In the foregoing example, consider the further assumption that the bronze tenant has deployed a computation algorithm that can utilize the entire computation resource of the available nodes (proxy, storage, etc.). Accordingly, the computation algorithm consumes the processing resources of the storage node, making the processing resources unavailable to other tenants (e.g., the gold tenant).

In this scenario, it will be appreciated that because the processing resources are consumed by the bronze tenant, each of the tenant's respective QoS plans are not being adequately utilized in the actual service that is being received by the respective tenants. The aforementioned challenge of providing adequate service to two differing tenants owes its roots in the fact that the embedded compute infrastructure within object storage is built for a single tenancy, or for a single user, and lacks computation resource limiting, security aspects when single namespace object storage is used for both data storage as well as data computation.

Figure 3:
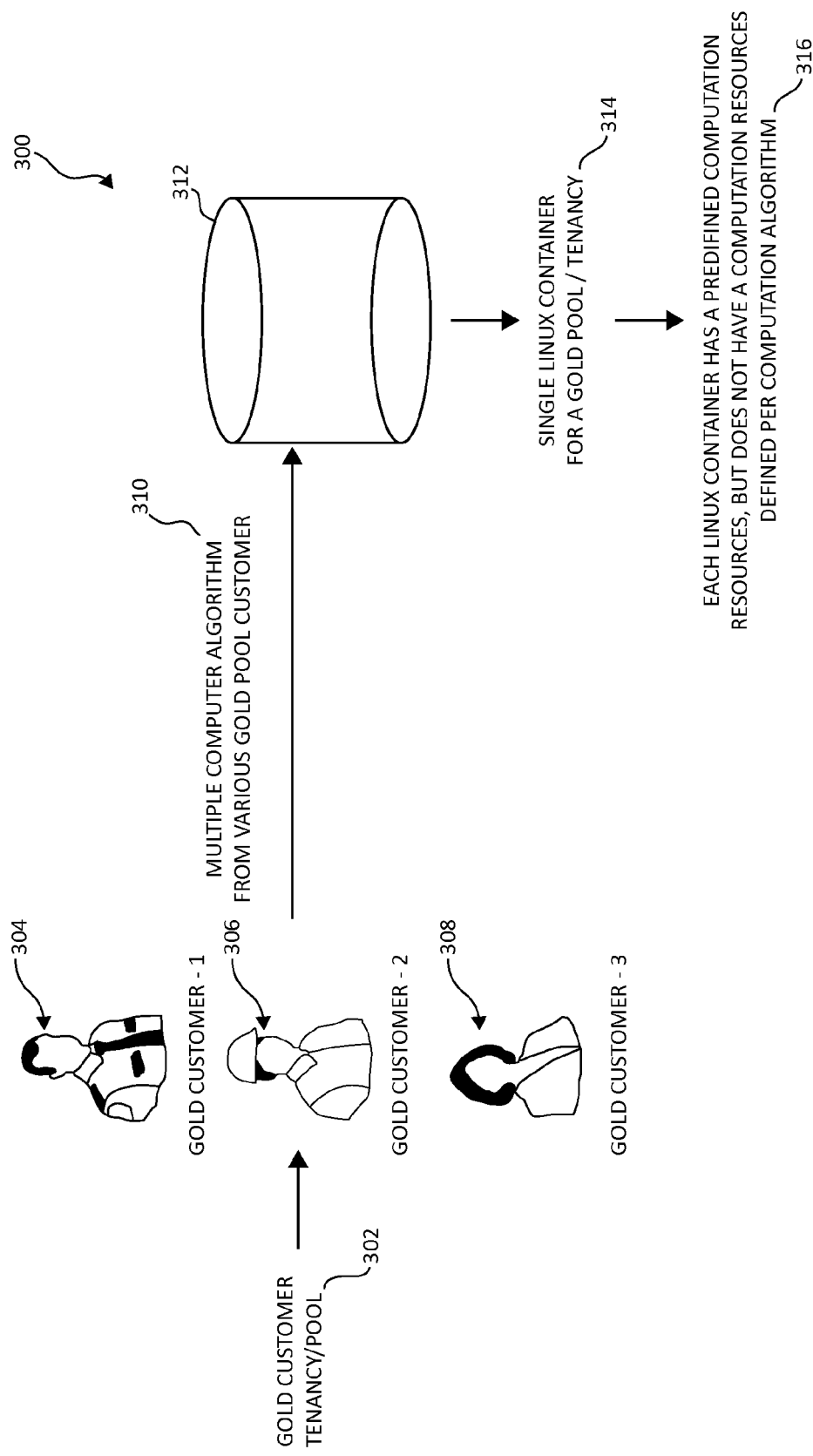
FIG. 3 is a block/flow diagram illustrating challenges in multi-tenancy use of object storage environments.

FIG. 3, following, further illustrates the challenges in object storage environments for servicing multiple tenants in scenario 300. Here, a single tier user tenancy/pool (in this case "gold") 302 includes users 304, 306, and 308 as shown. The pool users/customers each have accompanying computing/processing needs that are embodied in multiple computer algorithms 310 that are submitted into a single Linux container 312 for the gold pool/tenancy as shown in subsequent step 314. Each Linux container has one or more predefined computation resources, but does not have computation resources that are defined per the associated computation algorithms that are provided to the container (step 316).

Figure 4:
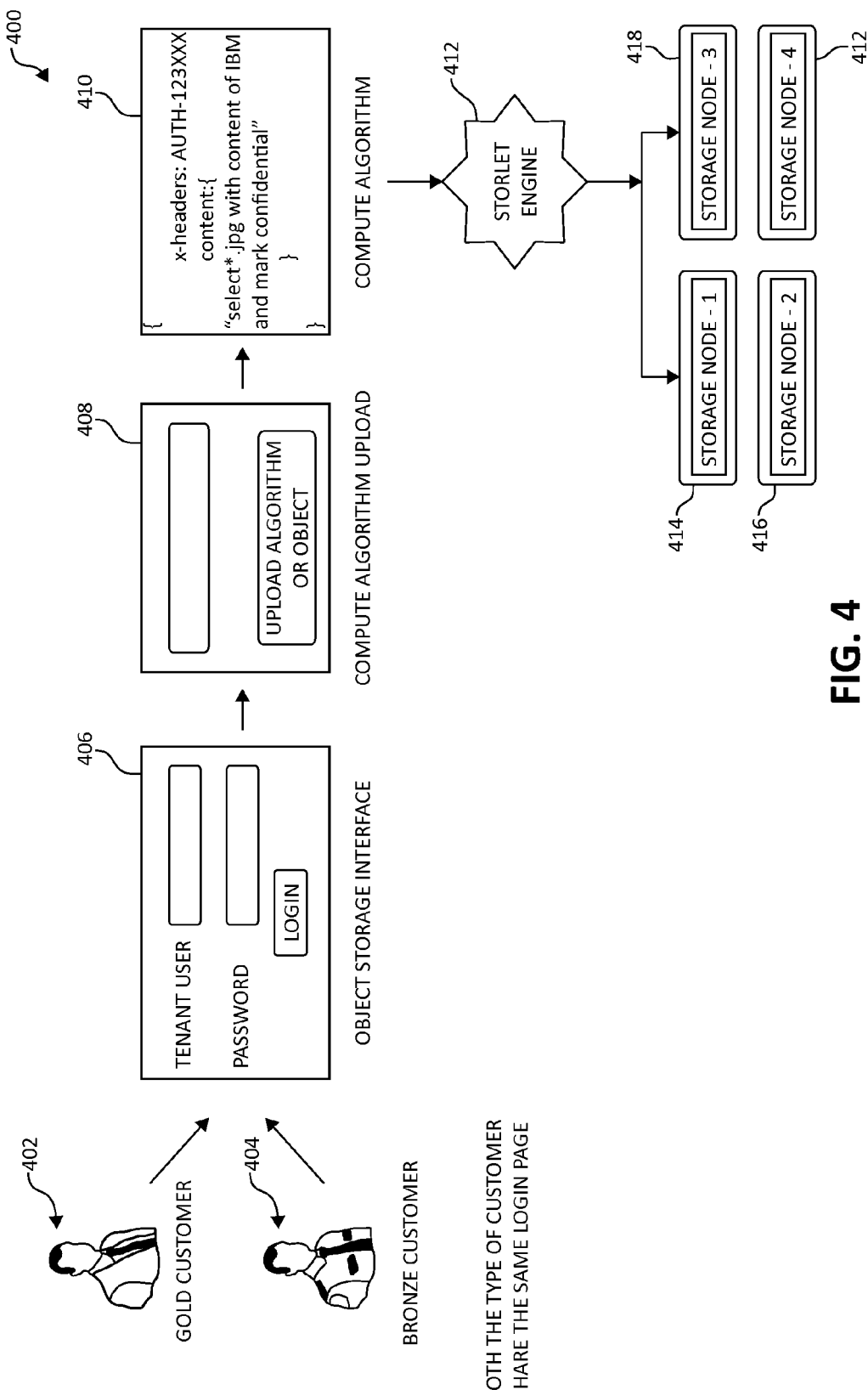
FIG. 4 is a block/flow diagram illustrating a storlet (e.g., embedded computing functionality within object storage) where each tenant's respective compute algorithm has equal priority towards embedded computation resources.

In FIG. 4, following, the challenges of servicing multiple tenancy in a single object storage interface is further illustrated in scenario 400. Here, a gold customer 402 and silver customer 404 both share a same login page 406 (containing the tenant user information and respective password as shown). Both classifications of tenants reach the following block 408, where an algorithm or object is uploaded to perform computing functionality, and is shown in block 410 following.

The storlet engine 412 upon receipt of the object, triggers a container or virtual machine to execute the compute algorithm utilizing the resources of the individual storage nodes 414, 416, 418, and 420. At the object storage hardware layer (e.g., CPU, network, memory, disk level, etc.), and as shown, there is no separation, or limits applied to execution of the compute algorithm 410 based on the QoS of either the gold customer 402 or the silver customer 404. In other words the compute algorithms deployed by both the customers are deemed by the storlet engine 412 to have equal priority, and one compute algorithm may consume the available processing resources.

Figure 5:
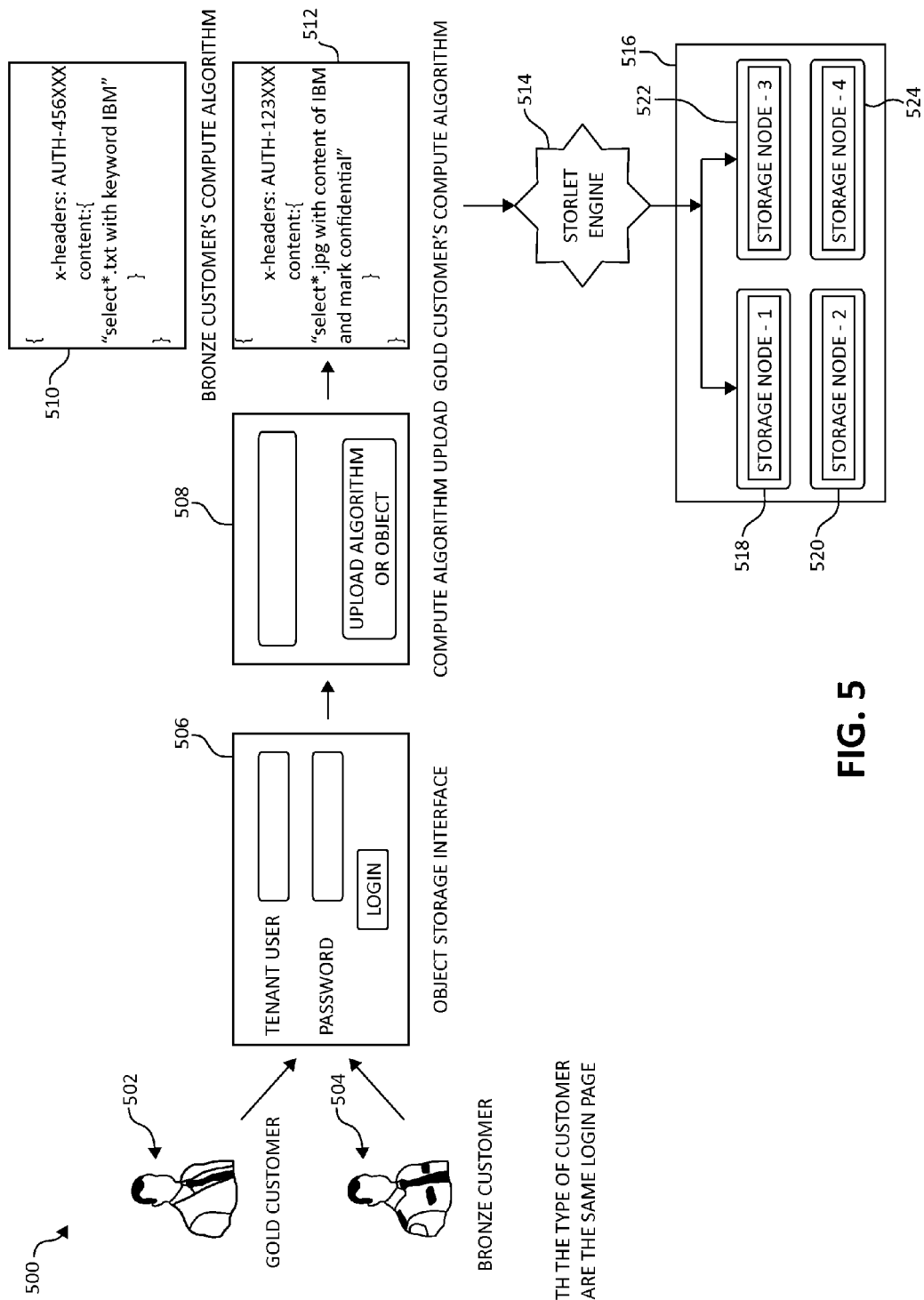
FIG. 5 is a block/flow diagram illustrating challenges faced by storlet architectures where one tenant's processing requirements may consume the available computing resources of the storage node as well as proxy nodes.

FIG. 5, following, further illustrates the challenges of multi tenancy object storage, here, however, with accompanying embedded compute functionality as scenario 500. In similar fashion as previously depicted in FIG. 4, gold customer 402 and bronze customer 404 again both share a same login page 506 that constitutes the object storage interface 506 for the object storage architecture. Upon gaining access, both classifications of tenants reach the following block 508, where both customers 502, 504 have accompanying algorithms or objects uploaded to perform computing functionality, here shown in blocks 510 and 512.

In the scenario 500 shown, both algorithms 510, 512 are then passed to the storlet engine 514, which accepts and processes the algorithms 510, 512 without regard to the providing customer 502 or 504. Accordingly, the silver customer's algorithm 510 and gold customer's algorithm 512 compete equally for embedded storage node processing resources, in which, as one example, the silver customer's algorithm 510 may consume the entirety of the available resources, leaving the higher priority gold customer 502 without processing capability.

Figure 6:
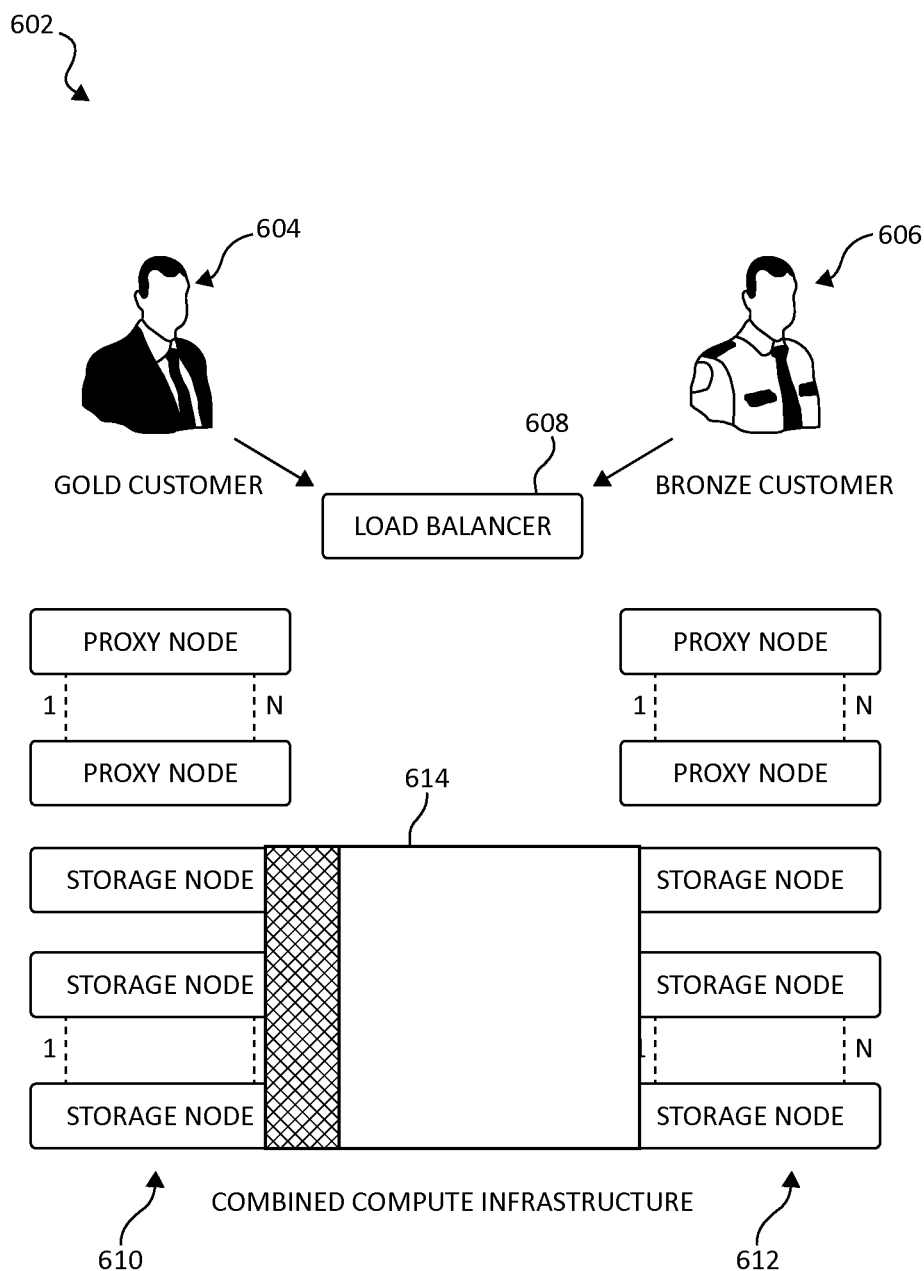
FIG. 6 is an additional block/flow diagram illustrating the challenges faced by combined computing embedded compute architecture where multiple tenants share equal access/priority to computing resources.

In a final illustration of the challenges presented by multiple tenancies in object storage environments, consider FIG. 6, following, showing object storage architecture 602, gold customer 604 and bronze customer 606, load balancer 608, and node groups 610 and 612 in similar fashion to previously illustrated. Here, the shared/combined embedded compute infrastructure 614 violates QoS requirements of the gold and bronze customers 604, 606, due to a framework not limiting resource utilization in an embedded computing infrastructure 602.

In contrast to, and to address the challenges described and illustrated in FIGS. 1-6, previously, the mechanisms of the illustrated embodiments provide a framework that enables appropriate limitation of the computation engine functionality according to the respective QoS options opted by the tenants, as well as enables a secure way to limit the scope of computation algorithm (i.e. sequence of computation steps that are required for extracting a particular set of information from a large set of raw data) in a geographically distributed object storage namespace.

The mechanisms of the illustrated embodiments provide several important advantages and aspects. Among those are inclusive, but not limited to the following. First, the computation resources may be allocated (e.g., RAM, CPU, Cache, and the like) in an account space that is based on the opted QoS plan of the respective end user.

Consider the following exemplary timeline flow. First the user, once access is obtained, subject to request, provides his computation algorithm as a payload. The mechanisms of the illustrated embodiments identify the owner of the request, and compare the identification with a scheme including a map of users along with respective opted QoS plans. Based on the identified QoS plan, the appropriate processing resources are allocated within the respective container or virtual machines (i.e., the resources of the container are inherently limited in accordance with QoS priorities).

In view of the exemplary timeline flow, a gold customer, for example, may utilize 60% of the overall compute resources, whereas the bronze customer may utilize the remaining 40% of the overall compute resources owned by a single account (container).

In addition to the foregoing, the mechanisms of the illustrated embodiments enable avenues for limitation of capability or operation embedded with the computer algorithm owned by the user, and again based on an opted QoS plan.

Consider the additional exemplary timeline flow as an example. The user, once access is obtained and again subject to request, provides her computation algorithm as a payload. The mechanisms of the illustrated embodiments identify the owner of the request, and compare the identified ownership with the scheme that includes the schema of users along with opted QoS plans corresponding to each user. Based on the identified QoS plan and operation embedded with the compute algorithm provided by the user, the mechanisms estimate the operation/results to occur by execution of the compute algorithm.

In view of the foregoing exemplary timeline flow, a gold customer's computer algorithm, for example, may perform advanced operations such as tar, zipping, image analysis, PDF to text conversion, etc., whereas the bronze customer's computer-owned compute algorithm may be limited only to performing the aforementioned zipping operation.

The mechanisms then validate the operations against the schema stored for the particular QoS plan, and then function to limit the compute algorithm deployment if the estimated results exceed operations beyond those operations specified in the schema.

In further addition to the foregoing, the mechanisms of the illustrated embodiments provide for avenues for limitation of access to particular components of embedded infrastructure. The particular components may be as varied as those contemplated by one of ordinary skill in the art, but may include deciding among such components as data stored on solid state drive (SSD) devices-based storage nodes vs. data stored on differing storage media, such as Serial Attachment (SATA) devices-based storage nodes, Near-Line Serial Attached SCSI (SAS)-based nodes, other SAS nodes, and the like, again as one of ordinary skill in the art will appreciate.

Consider the following additional exemplary timeline flow. Pursuant to request, the user, upon access, again provides a computation algorithm as a payload to the object storage environment. The mechanisms again identify the owner of the request, comparing the identification with the schema of roles along with the particular opted QoS plans to obtain the corresponding scheme applicable to the instant user. Based on the identified QoS plan, the mechanisms validate the resources requested by the accompanying compute algorithm, and, for example, make a determination whether data on an SSD-based storage node is required, or whether, for example, the request originated from a mobile device. The mechanisms then compare the resources demanded with the defined resources per the identified QoS plan and proceed according to the QoS plan.

In view of the foregoing additional exemplary timeline flow, the gold customer-owned compute algorithm may utilize a SSD-based node, may perform operations over a variety of file formats such as .jpg, .txt, .doc, etc., and may deploy the compute algorithm from mobile as well as standard desktop client platforms. Alternatively, the bronze customer-owned compute algorithm may be limited to utilize a SATA disk-based storage node, may perform operations over specified file formats such as .txt, and may deploy the compute algorithm only from a standard desktop client.

In view of the foregoing, the mechanisms of the illustrated embodiments then offer a proposed QoS framework or a middleware that assists in modeling requests from tenants for embedded computation functionality in object storage environments by aligning the requests with the tenants' respective QoS plans. Such a framework incorporates separation/limitations at the object storage hardware layer (e.g., CPU, network, disk, cache, memory, etc.), where all user requests are treated in differing fashion based on capabilities assigned according to QoS plans.

Furthermore, the mechanisms provide separation among container resources (e.g., CPU, RAM) that are allocated as per the capabilities assigned to each user. The mechanisms promote separation/limitations on the operations that a user may perform based on his/her QoS limits. The mechanisms promote separation or limitation on objects that may be used by the user based on his/her QoS limits. Finally, the mechanisms promote separation or limitations on hardware platforms or file content that may be used by the user, again based on his/her QoS plan.

Figure 7:
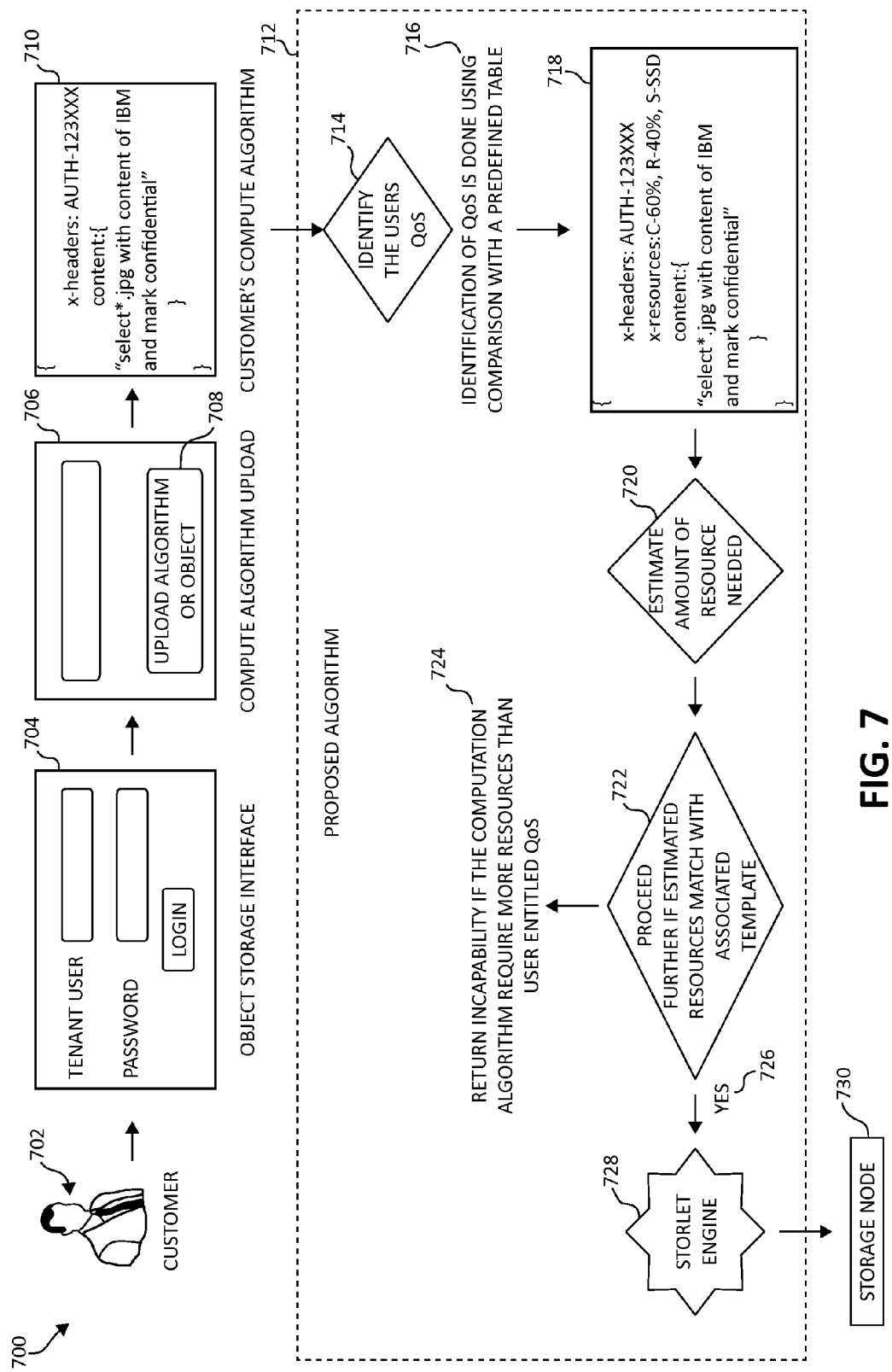
FIG. 7 is a block/flow diagram illustrating storlet architecture according to various aspects of the present invention, in which resources allocated to computing/processing needs are adhered to according to tenants of QoS policies adopted by end users.

Turning now to FIG. 7, following, an exemplary block/flow diagram 700 of providing a framework for QoS in multi-tenancy computing-embedded object storage environments is depicted, in accordance with various aspects of the present invention.

Here, a customer 702 (gold, silver, or bronze, for example) uses the object storage interface shown in block 704 to obtain access. The customer 702's respective compute algorithm is uploaded in blocks, 706, 708, and the customer's computer algorithm is shown in block 710 with accompanying respective header information.

In a subsequent series of functionality 712, the flow 700 serves to identify the customer/user's respective QoS, by, for example, using comparison with a predefined table (step 716). In a subsequent step, and as shown, a resource template (block 718) is defined and attached for that particular user according to the identified QoS.

The flow 700 then performs various estimations as shown in block 720, such as estimating, based on the uploaded compute algorithm, the user's resource template and the amount of available resources in the container, the amount(s) of resource needed to adequately fulfill the user's requests. Estimations may also be performed by executing the storlet engine in a sandbox environment and gauging the resource utilization before the compute algorithm is accepted for deployment. In one embodiment, the estimation of resource(s) needed may be performed by examining various keywords in the header information or elsewhere. For example, .jpg may denote an associated image that may require additional editing functionality by the storlet engine.

If the flow 700 determines that the estimated resource(s) align with the available resources allowed pursuant to the resource template and the user's specified QoS, then the computation functionality is allowed to proceed further for execution as seen in block 722. If, on the other hand, the system determines that the computation algorithm requires additional resources than what the respective user is entitled to pursuant to his/her instant QoS, then an incompatibility may be returned as shown by step 724.

Returning to step 722, if a yes decision 726 is made based on the foregoing, the flow 700 passes the compute algorithm to the resident storlet engine 728 of the storage node 730, which then sets to work executing the compute algorithm by leveraging the embedded compute functionality inherent in the storage node 730. In addition, the execution of the storelet engine may then be monitored by flow 700 to determine if the allocated resources being deployed remains congruent to the resource template.

Figure 8:
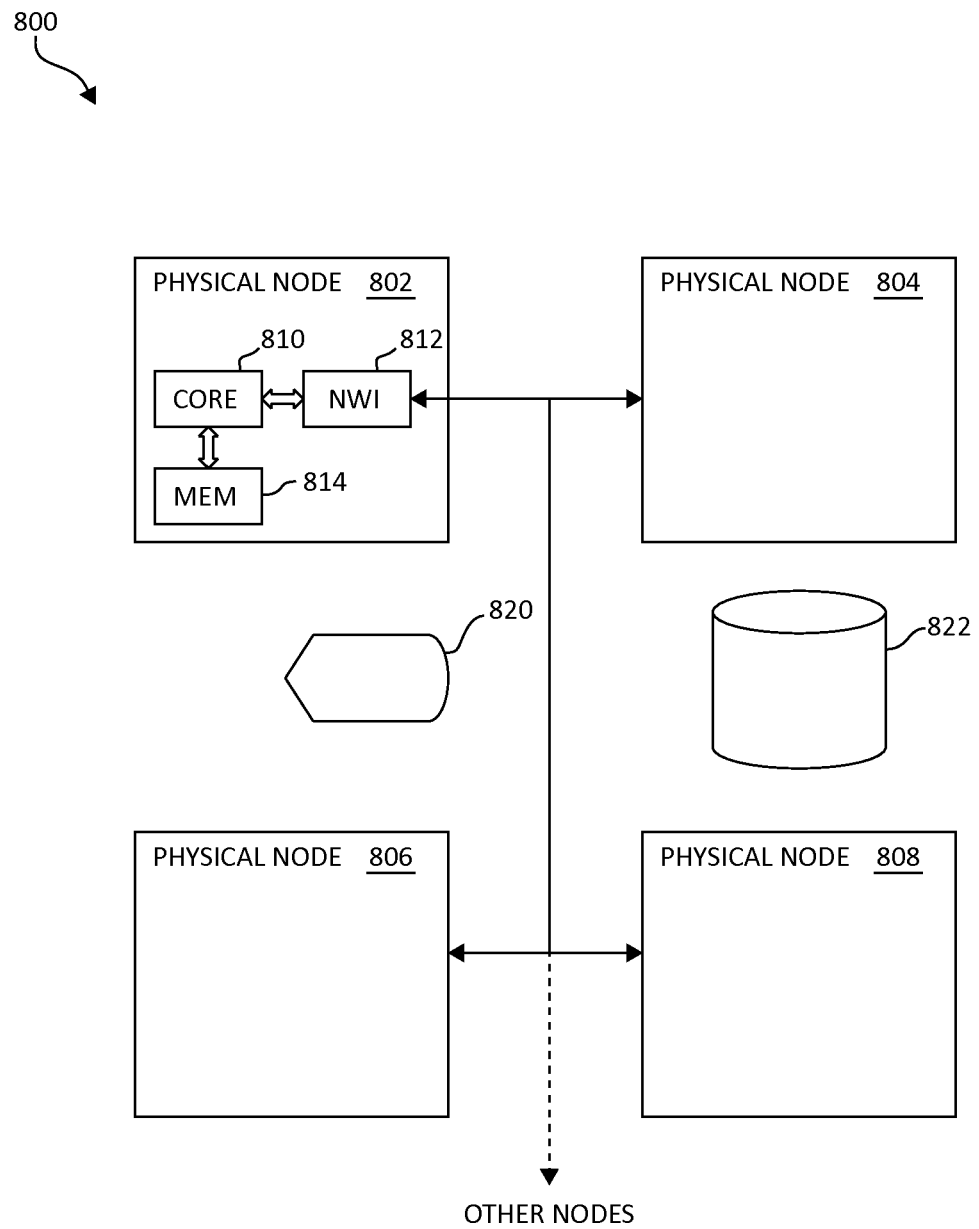
FIG. 8 is a block diagram of exemplary hardware in a distributed computing and data storage environment in which various aspects of the illustrated embodiments may be implemented.

Referring now to FIG. 8, a distributed computer system in accordance with an embodiment of the present invention is shown. A first physical processing (storage) node 802 includes a processor core 810 coupled to a memory 814 that stores program instructions for execution by processor 810. In one embodiment, the physical storage nodes (labeled as 802, 804, 806, and 808) represent storage nodes with embedded compute capability in object storage, according to the present invention. The program instructions include program instructions forming computer program products in accordance with embodiments of the invention that provide embedded computing functionality in storage physical nodes 802-808 for example.

Processing node 802 also includes a network interface (NWI) 812 that couples processing node 802 to a wired, wireless or hybrid network, which may be a standardized network such as Ethernet, or a proprietary network or interconnect bus. Other processing nodes 804-808 are of identical construction in the exemplary embodiment, but embodiments of the invention may be practiced in asymmetric distributed systems having nodes with differing features, such as differing storage media or other differing features. Although only four nodes 802-808 are illustrated, a distributed computer system in accordance with an embodiment of the present invention will generally include a large number of nodes connected via one or more networks. The distributed computer system of FIG. 8 also includes other resources such as I/O devices 820, including graphical display devices, printers, scanners, keyboards, mice, which may be coupled to the network or one of nodes 802-808 via workstation computers that provide a user interface to administrative personnel and other users. Storage nodes 802-808 are also coupled to storage devices 822, for storing and retrieving data and program instructions, such as storing computer program products in accordance with an embodiment of the invention.

Figure 9:
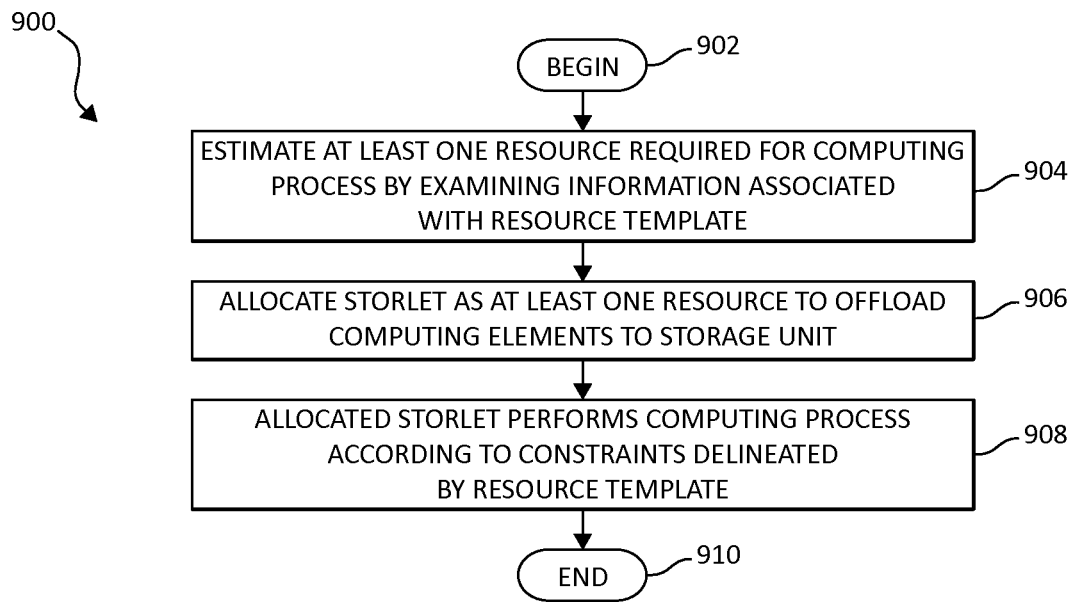
FIG. 9 is a flow chart diagram of an exemplary method for providing a framework for QoS in multi-tenancy serving object storage environments having embedded computing and processing capabilities, again in which various aspects of the illustrated embodiments may be implemented.

Turning now to FIG. 9, an exemplary method 900 for providing a framework for QoS in multi-tenant embedded computing object storage namespaces, in accordance with one embodiment of the present invention. Method. 900 begins (step 902) with the estimation of at least one resource required for a computing process by examination of information associated with a resource template of a particular user (step 904). A storlet, container or virtual machine (note, use of the terminology "storlet" herein may refer to any of these subsets of functionality) is allocated as at least one resource to offload computing elements to an affiliated storage unit (step 906). The allocated storlet then performs various computing process(es) according to the constraint(s) delineated by the aforementioned resource template (step 908). The method 900 then ends (step 910).

Figure 10:
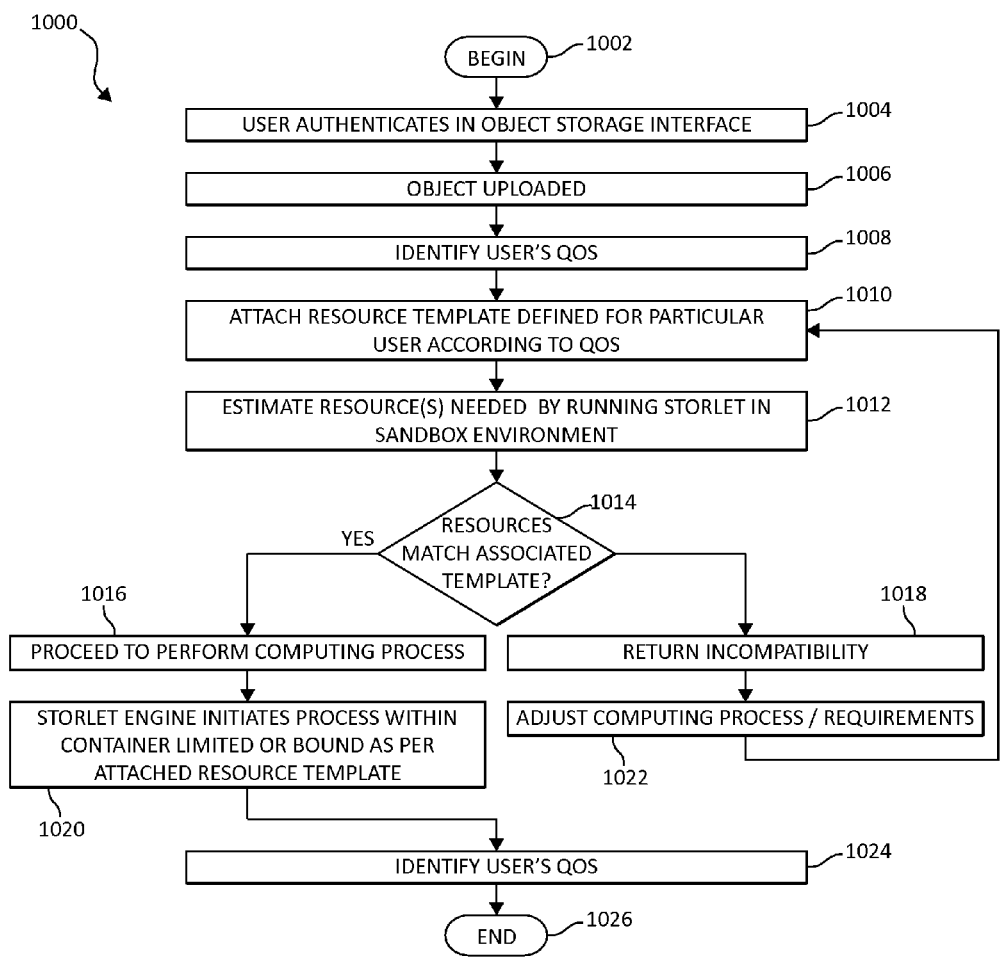
FIG. 10 is a flow chart diagram of an additional exemplary method for providing a framework for QoS in multi-tenancy, embedded object storage environments, here again in which aspects of the illustrated embodiments may be implemented.

FIG. 10, following, illustrates various additional aspects of the present invention as method 1000, here again showing an exemplary framework provided for QoS for multi-tenant compute embedded object storage environments. Method 1000 begins (step 1002) with the authentication of the user in the object storage interface (step 1004). The object or compute algorithm affiliated with the user (i.e., the users request(s) to utilize the embedded computing resources to perform computing tasks) is uploaded in a subsequent step 1006.

The method 1000 then identifies the accessing user's respective QoS scheme from examination of the various users that may, for example, be contained in a table or other database, or any data structure. The resource template defined for the instant user, based on the user's QoS, is then attached to the object/compute algorithm (step 1010), and the system then estimates resource(s) needed for the embedded compute functionality to complete the user's request, by for example, running the storlet engine in a sandbox environment as previously mentioned (step 1012). Here again, the method 100 may use additional mechanisms to estimate the resource(s) required for a particular object or compute algorithm, as previously described.

Once the resource(s) have been estimated, the method 1000 queries whether the resources necessary align with the selected resource template that has been attached (step 1014). If so, the method 1000 proceeds to perform one or more computing processes (step 1016), by, for example, initiating a process by the storlet engine within the applicable container as limited or bound as per the attached resource template, and monitoring execution of the storlet to ensure that the allocated computing resources are being appropriately utilized (underuse or overuse) (step 1020). The computing process then completes (step 1024), and the method 1000 ends (step 1026).

Returning to step 1014, alternatively, if the resources necessary are not found to align with the selected/attached resource template, the method 1000 returns an incompatibility (step 1018), and the method 1000 may make adjustments in the manner in which the limited computing resources available in the storlet may be used (here again, in accordance with the instant user's QoS plan requirements) (step 1022). The method 1000 then returns to step 1010 in which, for example, an updated resource template may be attached for the particular user that is reflective of the limited resources available.

In view of FIGS. 9 and 10, consider various benefits provided by the mechanisms of the illustrated embodiments, in which, among other aspects, in a storlet (embed compute within object storage) architecture (which is an emerging architecture where compute elements are uploaded to storage clouds) provides a method or framework that enables a way to shape the end user deployed computational storlets on the storage system to the respective QoS associated with the tenants for their storage in a geographically distributed object storage namespace.

Among other benefits, the mechanisms of the illustrated embodiments provide an ability to dynamically associated and attach the QoS to the computational entities (called storlets) which are explicitly uploaded by the end user of the object storage to run computation on his storage, such that they inherit the QoS associated with the storage. Existing prior art has not contemplated QOS association with compute elements being uploaded to storage. Instead, conventionally, such architectures contain a separate compute and QOS associated with the architecture, and separate storage and QOS associated with the architecture—but none have contemplated compute being an element (storlet) that can be uploaded on fly by the end user on the object storage cloud that executes on the storage node and is able to be qualified and dynamically shaped for resources by fully implementing the QOS of the user associated for the storage usage in the created framework of the present invention.

Among additional other benefits, the mechanisms of the illustrated embodiments provide an ability to analyze the computation element (storlet) being uploaded by the object storage user to determine if the computation element qualifies for the quality of service associated with the storage user for his storage usage by performing a sandbox execution of the storlet and monitoring the storlet's resource usage and time period usage as well as verifying the headers associated with the computational element. This is to ensure that only storlets which map to the resource profile associated with the QOS of the storage users will be allowed to be deployed and executed on the storage. Other storlets not mapping to the resource profile are rejected, thus ensuring the QoS requirements for differing tenants remain intact, which is beneficial in cloud and/or distributed computing environments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method providing a framework for Quality of Service (QoS) within and between globally distributed computing components by a processor, the method comprising:
    identifying a QoS for a particular user by comparing identification information with information in a predefined table;
    defining a resource template for the user based on the identified QoS, the resource template specifying computing resources required for a computing process uploaded by the user to an object store;
    appending information, including header and metadata information associated with the computing process, to the resource template;
    estimating at least one resource required for the computing process by examining information associated with the resource template and executing the computing process from within a sandboxed environment in the object store to gauge resource utilization prior to accepting the computing process for general deployment, wherein the computing process is accepted for general deployment when the resource utilization aligns with constraints delineated by the resource template, and upon accepting the computing process for general deployment:

allocating a storlet as the at least one resource at a storage node, the storlet comprising embedded compute functionality within the object store and thereby offloading computing elements to at least one storage unit;

wherein the allocated storlet performs the computing process according to the constraints delineated by the resource template to efficiently manage and bound the computing resources between multiple tenants of the object store.

2. The method of claim 1, further including examining the resource template, including the appended information, as defined for the user, wherein:

if the estimated at least one resource required for the computing process exceeds the delineated constraints of the resource template, returning an incompatibility, and if the estimated at least one resource required for the computing process does not exceed the delineated constraints of the resource template, allowing the storlet to proceed to perform the computing process.

3. The method of claim 1, further including monitoring the storlet to determine a utilization of the at least one resource as the computing process is performed.

4. The method of claim 1, wherein performing, by the allocated storlet, the computing process according to constraints delineated by the resource template further includes limiting an access of the computing process to an embedded computing infrastructure associated with the storlet.

5. The method of claim 1, wherein performing, by the allocated storlet, the computing process according to constraints delineated by the resource template further includes selecting a storage media determined to appropriately correspond to the resource template for the computing process.

6. The method of claim 1, wherein performing, by the allocated storlet, the computing process according to constraints delineated by the resource template further includes limiting an access of the computing process to at least one client.

7. A system providing a framework for Quality of Service (QoS) within and between globally distributed computing components, comprising:

a processor, coupled to a memory which stores computer readable program instructions that when executed by the processor:

identifies a QoS for a particular user by comparing identification information with information in a predefined table, defines a resource template for the user based on the identified QoS, the resource template specifying computing resources required for a computing process uploaded by the user to an object store, appends information, including header and metadata information associated with the computing process, to the resource template, estimates at least one resource required for Hall the computing process by examining information associated with Hall the resource template and executing the computing process from within a sandboxed environment in the object store to gauge resource utilization prior to accepting the computing process for general deployment, wherein the computing process is accepted for general deployment when the resource utilization aligns with constraints delineated by the resource template, and upon accepting the computing process for general deployment:

allocates a storlet as the at least one resource at a storage node, the storlet comprising embedded compute functionality within the object store and thereby offloading computing elements to at least one storage unit;

wherein the allocated storlet performs the computing process according to the constraints delineated by the resource template to efficiently manage and bound the computing resources between multiple tenants of the object store.

8. The system of claim 7, wherein the processor examines the resource template, including the appended information, as defined for the user, wherein:

if the estimated at least one resource required for the computing process exceeds the delineated constraints of the resource template, the processor returns an incompatibility, and if the estimated at least one resource required for the computing process does not exceed the delineated constraints of the resource template, the processor allows the storlet to proceed to perform the computing process.

9. The system of claim 7, wherein the processor monitors the storlet to determine a utilization of the at least one resource as the computing process is performed.

10. The system of claim 7, wherein the processor, pursuant to performing, by the allocated storlet the computing process according to constraints delineated by the resource template, limits an access of the computing process to an embedded computing infrastructure associated with the storlet.

11. The system of claim 7, wherein the processor, pursuant to performing, by the allocated storlet the computing process according to constraints delineated by the resource template, selects a storage media determined to appropriately correspond to the resource template for the computing process.

12. The system of claim 7, wherein the processor, pursuant to performing, by the allocated storlet the computing process according to constraints delineated by the resource template, limits an access of the computing process to at least one client.

13. A computer program product providing a framework for Quality of Service (QoS) within and between globally distributed computing components by a processor, the computer program product comprising a non-transitory computer-readable storage medium having computer-readable program code portions stored therein, the computer-readable program code portions comprising:

an executable portion that identifies a QoS for a particular user by comparing identification information with information in a predefined table;

an executable portion that defines a resource template for the user based on the identified QoS, the resource template specifying computing resources required for a computing process uploaded by the user to an object store;

an executable portion that appends information, including header and metadata information associated with the computing process, to the resource template;

an executable portion that estimates at least one resource required for the computing process by examining information associated with the resource template and executing the computing process from within a sandboxed environment in the object store to gauge resource utilization prior to accepting the computing process for general deployment, wherein the computing process is accepted for general deployment when the resource utilization aligns with constraints delineated by the resource template, and upon accepting the computing process for general deployment:

an executable portion that allocates a storlet as the at least one resource at a storage node, the storlet comprising embedded compute functionality within the object store and thereby offloading computing elements to at least one storage unit;

wherein the allocated storlet performs the computing process according to the constraints delineated by the resource template to efficiently manage and bound the computing resources between multiple tenants of the object store.

14. The computer program product of claim 13, further including an executable portion that examines the resource template, including the appended information, as defined for the user, wherein:

if the estimated at least one resource required for the computing process exceeds the delineated constraints of the resource template, an incompatibility is returned, and if the estimated at least one resource required for the computing process does not exceed the delineated constraints of the resource template, the storlet is allowed to proceed to perform the computing process.

15. The computer program product of claim 13, further including an executable portion that monitors the storlet to determine a utilization of the at least one resource as the computing process is performed.

16. The computer program product of claim 13, further including an executable portion that, pursuant to performing, by the allocated storlet the computing process according to constraints delineated by the resource template, limits an access of the computing process to an embedded computing infrastructure associated with the storlet.

17. The computer program product of claim 13, further including an executable portion that, pursuant to performing, by the allocated storlet the computing process according to constraints delineated by the resource template, selects a storage media determined to appropriately correspond to the resource template for the computing process.

18. The computer program product of claim 13 further including an executable portion that, pursuant to performing, by the allocated storlet the computing process according to constraints delineated by the resource template, limits an access of the computing process to at least one client.

* * * * *